(12) United States Patent
Tsai et al.

(10) Patent No.: US 8,712,625 B2
(45) Date of Patent: Apr. 29, 2014

(54) AUTOMATIC SEARCH SYSTEM AND METHOD

(75) Inventors: Hung-Yin Tsai, Hsinchu County (TW);
Ming-Hwei Perng, Hsinchu (TW);
Yen-Wen Huang, Taipei (TW); Yen-Po Lin, Taipei (TW)

(73) Assignee: National Tsing Hua University, Hsinchu (TW)

( * ) Notice: Subject to any disclaimer, the term of this patent is extended or adjusted under 35 U.S.C. 154(b) by 765 days.

(21) Appl. No.: 12/858,771

(22) Filed: Aug. 18, 2010

(65) Prior Publication Data

US 2011/0046838 A1    Feb. 24, 2011

(30) Foreign Application Priority Data

Aug. 20, 2009 (TW) ................................ 98128021 A

(51) Int. Cl.
*G05D 1/00* (2006.01)
(52) U.S. Cl.
USPC .................. 701/28; 701/23; 701/25; 700/245; 700/259; 901/1
(58) Field of Classification Search
USPC .............. 701/28, 23, 25; 901/1; 700/245, 259
See application file for complete search history.

(56) References Cited

U.S. PATENT DOCUMENTS

| | | | |
|---|---|---|---|
| 4,679,152 A * | 7/1987 | Perdue ............................ | 701/23 |
| 6,501,537 B1 * | 12/2002 | Chahl et al. ................... | 356/3.14 |
| 6,845,297 B2 * | 1/2005 | Allard ............................ | 700/259 |
| 7,305,114 B2 * | 12/2007 | Wolff et al. .................... | 382/141 |
| 7,421,092 B2 * | 9/2008 | Clarkson et al. ............... | 382/103 |
| 2003/0120714 A1 * | 6/2003 | Wolff et al. .................... | 709/200 |
| 2003/0216834 A1 * | 11/2003 | Allard ............................ | 700/245 |
| 2006/0055776 A1 * | 3/2006 | Nobori et al. .................. | 348/142 |
| 2011/0046838 A1 * | 2/2011 | Tsai et al. ........................ | 701/28 |

FOREIGN PATENT DOCUMENTS

| | | |
|---|---|---|
| TW | 514515 | 12/2002 |
| TW | I238655 | 8/2005 |

* cited by examiner

*Primary Examiner* — Thomas Black
*Assistant Examiner* — Wae Louie
(74) *Attorney, Agent, or Firm* — Muncy, Geissler, Olds & Lowe, P.C.

(57) ABSTRACT

An automatic search system and a method for assisting a mobile apparatus to search for a matching device are provided. The automatic search method includes the following steps. First, N sets of consecutive images are captured at N time points respectively when the mobile apparatus moves along a first direction. The N is a positive integer greater than 1. Next, the N sets of consecutive images are received, and several image features of the N sets of images are compared, so as to determine accordingly whether the matching device exists in the first direction. If it is determined that the matching device exists, a route signal and an adjustment signal are generated. Next, according to the route signal, the mobile apparatus is controlled to move to an adjacent position of the matching device. Also, according to the adjustment signal, the mobile apparatus is controlled to be combined with the matching device.

20 Claims, 3 Drawing Sheets

AUTOMATIC SEARCH SYSTEM AND METHOD

CROSS-REFERENCE TO RELATED APPLICATION

This application claims the benefit of Taiwan Patent Application No. 098128021, filed on Aug. 20, 2009, which is hereby incorporated by reference for all purposes as if fully set forth herein.

BACKGROUND OF THE INVENTION

1. Field of Invention

The invention relates to an automatic search system and a method thereof, and more particularly to an automatic search system and a method thereof applicable to a mobile apparatus.

2. Related Art

With the development of technology, robots are widely applied for industrial purposes and robots gradually replace humans to perform highly repetitive or dangerous tasks.

For example, in the industry such as automobile manufacturing and electronic product assembly, mechanical arms can do works such as welding, quality control, inspection, and assembly. In the military field, robots can be used to do works such as demolition and ammunition removal. In civil and building engineering, the mechanical arms can be used to do works such as gutter digging, bricklaying, spray painting, and ceramic tile installation. In resource exploration, the robots can be used to do works such as mining and oil exploration. In environmental protection, the robots can be used to do works such as cleaning, environment analysis, and air detection.

In addition, interaction-based robots are also gradually developed to assist work that requires interaction with people. For example, currently, care robots for taking care of older people or patients, security robots for home security, or service robots capable of interaction with people are released. It is believed that in the future, more and more types of robots are going to be designed to make the life of people more convenient.

When the robots perform tasks, parts might need to be replaced for different works. For example, a cleaning robot can use nozzles having different structures for cleaning, and an exploration robot can choose drill bits of different materials for digging according to different geologic conditions. Additionally, robots usually need power supplies to maintain their operations. Although some robots have embedded batteries, robots still need power supply through sockets due to large power consumption.

In order to make a robot full automatic, it becomes an object for persons skilled in the art on how to search for a socket and connect to the socket without manual assistance. Currently, some persons skilled in the art already help a robot to search for a socket by adding sensors on the socket and the robot and providing the two with positioning information. However, such a design only enables the robot to search for a socket installed with a sensor. In order to enable the robot to find more sockets, sensors need to be installed on a plurality of sockets, thus resulting in high-use cost and inconveniences in use.

SUMMARY OF THE INVENTION

Therefore, the invention is directed to an automatic search system applicable to the mobile apparatus such as robots, so as to assist the mobile apparatus to search for a matching device, thereby solving the problem in the prior art. Of course, the automatic search system of the invention can also be applied to other mobile apparatuses to assist the mobile apparatuses to search for matching devices.

According to an embodiment, the invention provides an automatic search system, which includes an image capture module, a processing module, a movement module, and a matching module. Also, the processing module is connected to the image capture module, the movement module, and the matching module, respectively.

The image capture module of the mobile apparatus captures N sets of consecutive images at N time points respectively when the mobile apparatus moves along a first direction. The N is a positive integer greater than 1. The processing module is connected to the image capture module, and used for receiving the N sets of consecutive images, comparing M image features of the N sets of consecutive images, and determining whether a matching device exists in the first direction accordingly. The M is a positive integer. If it is determined that the matching device exists, the processing module generates a route signal and an adjustment signal.

The movement module is connected to the processing module, and used for receiving the route signal and moving according to the route signal, so that the mobile apparatus moves to an adjacent position of the matching device. Additionally, the matching module is connected to the processing module, and used for receiving the adjustment signal and being combined with the matching device according to the adjustment signal.

In another embodiment, the invention provides an automatic search method applicable to a mobile apparatus, so as to assist the mobile apparatus to search for a matching device, thereby solving the problem in the prior art.

According to an embodiment, the automatic search method of the invention includes the following steps. (a) N sets of consecutive images are captured at N time points respectively when the mobile apparatus moves along a first direction. The N is a positive integer greater than 1. (b) The N sets of consecutive images are received, M image features of the N sets of consecutive images are compared, and it is determined whether a matching device exists in the first direction accordingly. The M is a positive integer. (c) If it is determined in Step (b) that the matching device exists, a route signal and an adjustment signal are generated. (d) The route signal is received, and the mobile apparatus is controlled to move to an adjacent position of the matching device according to the route signal. (e) The adjustment signal is received, and the mobile apparatus is controlled to be combined with the matching device according to the adjustment signal.

In conclusion, the automatic search system and method according to the invention generate a route signal and an adjustment signal in a mode of image capturing and analysis, so as to control the mobile apparatus to move to an adjacent position of the matching device automatically and be combined with the matching device, thereby solving the problem in the prior art.

The advantages and spirits of the invention are further understood through the detailed illustration and the accompanying drawings below.

DETAILED DESCRIPTION OF THE INVENTION

The invention provides an automatic search system and method, used for assisting a mobile apparatus to search for a matching device. Several specific embodiments of the automatic search system and method of the invention are described as follows.

In practice, the mobile apparatus of the invention cam be, but not limited to, a robot.

Figure 1:
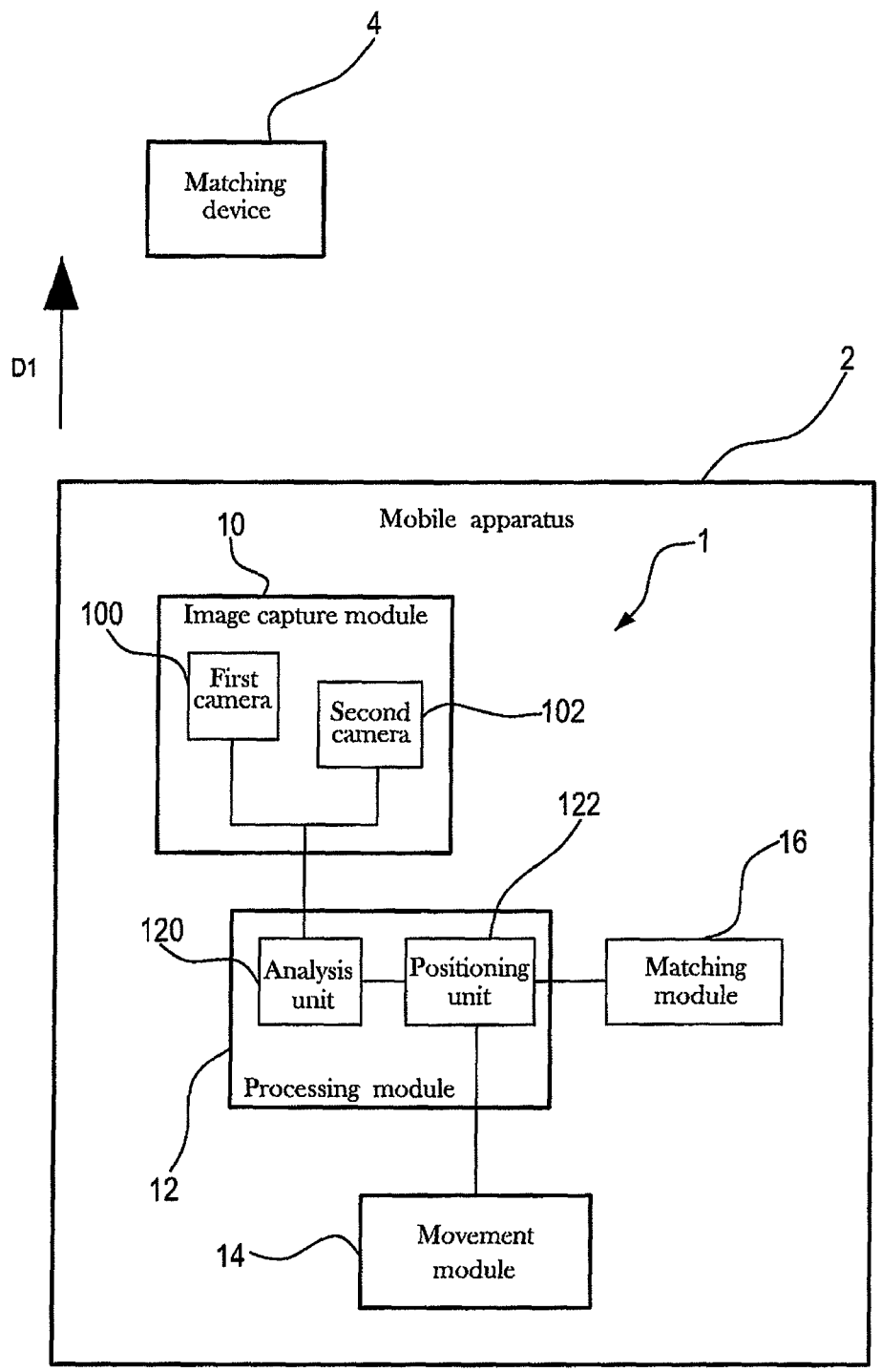
FIG. 1 is a functional block diagram of an automatic search system according to an embodiment of the invention.

Referring to FIG. 1, FIG. 1 is a functional block diagram of an automatic search system according to an embodiment of the invention. As shown in FIG. 1, an automatic search system 1 in this embodiment includes an image capture module 10, a processing module 12, a movement module 14, and a matching module 16.

The image capture module 10 includes a first camera 100 and second camera 102, which capture at least one set of consecutive images from a first view angle and a second view angle at at least one time point respectively when the mobile apparatus 2 moves along a first direction D1. In other words, at each time point, the image capture module 10 in this embodiment can capture a first view angle image and a second view angle image respectively.

Of course, in practice, the image capture module 10 in the invention can include more cameras to capture images at more different view angles.

The processing module 12 further includes an analysis unit 120 and a positioning unit 122. The analysis unit 120 is connected to the first camera 100 and the second camera 102 of the image capture module 10, and used for comparing several image features of the first view angle image and second view angle image at each time point and determining whether a matching device 4 exists in the first direction D1 accordingly. If positive, the analysis unit 120 generates position information related to the matching device 4. Additionally, the positioning unit 122 is connected to the analysis unit 120, and used for receiving the position information, and generating a route signal and an adjustment signal according to the position information.

In practical applications, the image features can be, but not limited to, a boundary of the matching device, a specific color tone area representing the matching device, a specific material area representing the matching device, or an additional mark or symbol (such as a cross mark and an asterisk) on the matching device. For example, when the matching device is a socket, the socket might have a boundary having an approximate square shape and two black strip areas in parallel at the center of the boundary. Further, for example, when the matching device is a nozzle of a vacuum cleaner, the vacuum cleaner might have a T-shaped boundary, a head portion of the nozzle has plastic materials and dark color brush portion. In practice, the image features can change with different matching devices and the invention is not limited to the examples herein.

In practical applications, the automatic search system of the invention can include a comparison table in which image features of various matching devices are stored in advance. Therefore, the analysis unit 120 of the processing module 12 can compare the captured candidate blocks in the image with data in the comparison table, so as to determine whether the matching device is included in the candidate blocks.

Additionally, in practical applications, the position information can be, but not limited to, position information such as a depth, a horizontal distance, and a vertical distance of the matching device 4 relative to the mobile apparatus 2. In practice, the depth of the matching device 4 relative to the mobile apparatus 2 is established by comparing relative positions of the matching devices 4 having the same image features in the plurality of images having different angle views.

The movement module 14 is connected to a positioning unit 122 of the processing module 12, and used for receiving the route signal, and moving the mobile apparatus 2 to an adjacent position of the matching device 4 according to the route signal. In practice, the movement module 14 includes a motor, a gear, a shaft, wheels or other suitable elements to move the mobile apparatus.

The matching module 16 is connected to the positioning unit 122 of the processing module 12, and used for receiving the adjustment signal. When the movement module 14 moves the mobile apparatus 2 to the adjacent position of the matching device 4, the matching module 16 is combined with the matching device 4 according to the adjustment signal. In practice, the matching module 16 include a rotatable, movable, and moving arm, an end portion of which includes a fixing portion, so as to be combined with the matching device 4. In practical applications, the fixing portion can be a fixing column, a fixing clip, a hook, a grove or other suitable fixing structures depending on the type of the matching device 4.

In practical applications, when a plurality of matching devices exists in a first direction, the processing module 12 further determines a distance between a user (for example, but not limited to, a patient that the mobile apparatus 2 is responsible to care) and each of the matching devices according to the at least one set of images, and generates a route signal and an adjustment signal according to the distance. In other words, the processing module 12 can select a matching device that is nearer to the user as a target matching device, and the mobile apparatus 2 is controlled to be combined with the target matching device.

In practice, when the processing module 12 determines that no matching device exists in a first direction, the processing module 12 generates a rotation signal to control the image capture module 10 or the mobile apparatus 2 to rotate a preset angle to a second direction, and controls the image capture module 10 to capture at least one set of consecutive images of the mobile apparatus 2 in the second direction, and performing the determination procedure again. Further, the processing module 12 calculates an accumulated value of a preset angle, and when the accumulated value exceeds 360°, the processing module 12 controls the mobile apparatus 2 to move to another position.

Additionally, in practice, when the processing module 12 determines that the matching device 4 exists in the first direction at a $1^{st}$ time point and determines that no matching device exists in the first direction at a $n^{th}$ time point, the processing module 12 calculates the number of time points when no matching device is found. When the number of time points when no matching device is found exceeds a preset number (for example, but not limited to, 10), the processing module 12 controls the mobile apparatus 2 to move to another position to perform searching and positioning of the matching device again.

Figure 2:
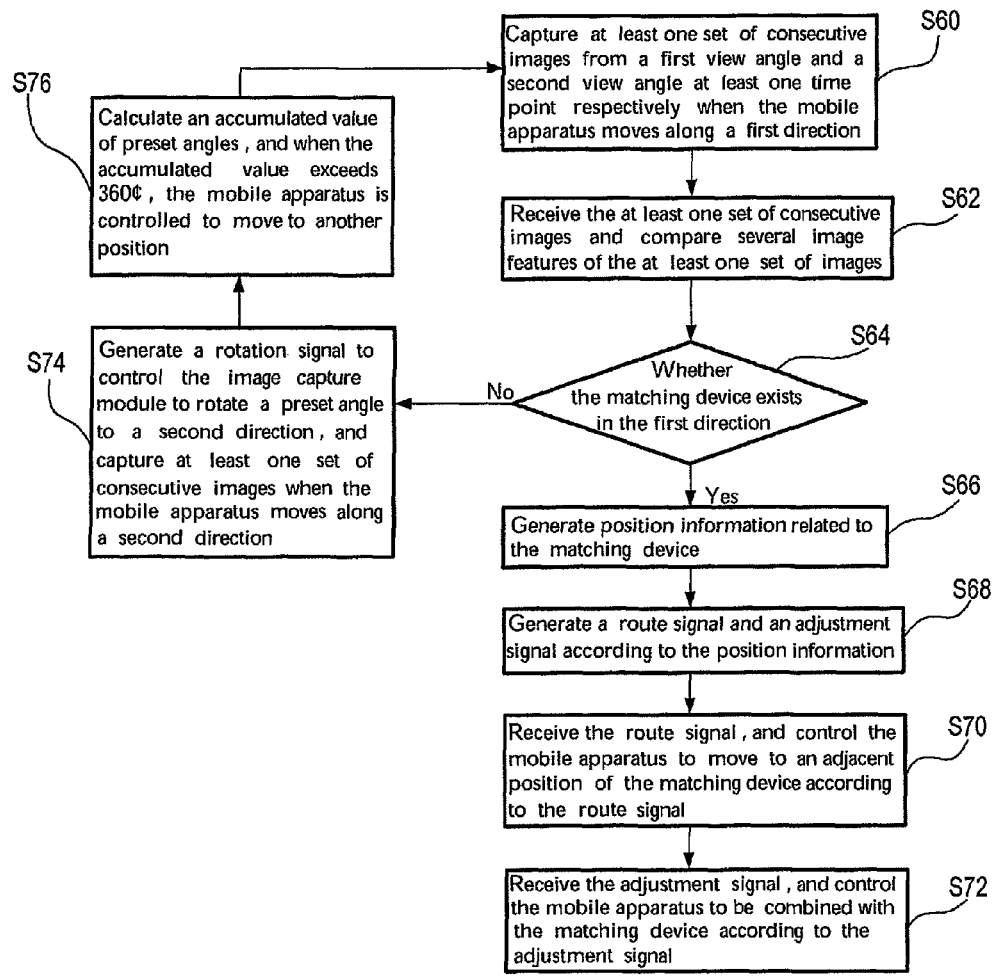
FIG. 2 is a flow chart of an automatic search method according to an embodiment of the invention.

The invention further provides an automatic search method used for assisting a mobile apparatus to search for a matching device. Referring to FIG. 2, FIG. 2 is a flow chart of an automatic search method according to an embodiment of the invention. As shown in FIG. 2, the automatic search method in this embodiment includes the following steps.

First, in Step S60, at least one set of consecutive images is captured from a first view angle and a second view angle at at least one time point respectively when the mobile apparatus moves along a first direction. As discussed above, in practice, images at different angle views are captured by different cameras. Therefore, more cameras can be included to capture more images of other angle views.

Subsequently, in Step S62, the at least one set of consecutive images is received, and several image features of the at least one set of images are compared. In Step S64, it is determined whether the matching device exists in the first direction.

Next, if it is determined in Step S64 that the matching device exists, in Step S66, position information related to the matching device is generated. Next, in Step S68, a route signal and an adjustment signal are generated according to the position information. Also, in Step S70, the route signal is received, and the mobile apparatus is controlled to move to an adjacent position of the matching device according to the route signal. Subsequently, in Step S72, the adjustment signal is received, and the mobile apparatus is controlled to be combined with the matching device according to the adjustment signal.

It should be noted that Steps S70 and S72 can be performed synchronously. Additionally, when the mobile apparatus and the matching device are combined, the matching device can be used to perform a preset task. For example, when the matching device is a socket, the mobile apparatus can be supplied with power through the matching device. Alternatively, when the matching device is a blanket, the mobile apparatus can deliver the blanket to the person who is taken care of for use.

In addition, if it is determined in Step S64 that no matching device exists, it is determined that an obstacle might exist between the mobile apparatus and the matching device, or a distance between the mobile apparatus and the matching device is too large. At this time, Step S74 is performed, so as to generate a rotation signal to control the image capture module to rotate a preset angle to a second direction, and capture at least one set of consecutive images when the mobile apparatus moves along a second direction. Also, in Step S76, an accumulated value of preset angles is calculated, and when the accumulated value exceeds 360°, the mobile apparatus is controlled to move to another position, and Step S60 is performed again. In practice, in Step S76, the mobile apparatus can also be controlled to rotate a preset angle to the second direction.

Figure 3:
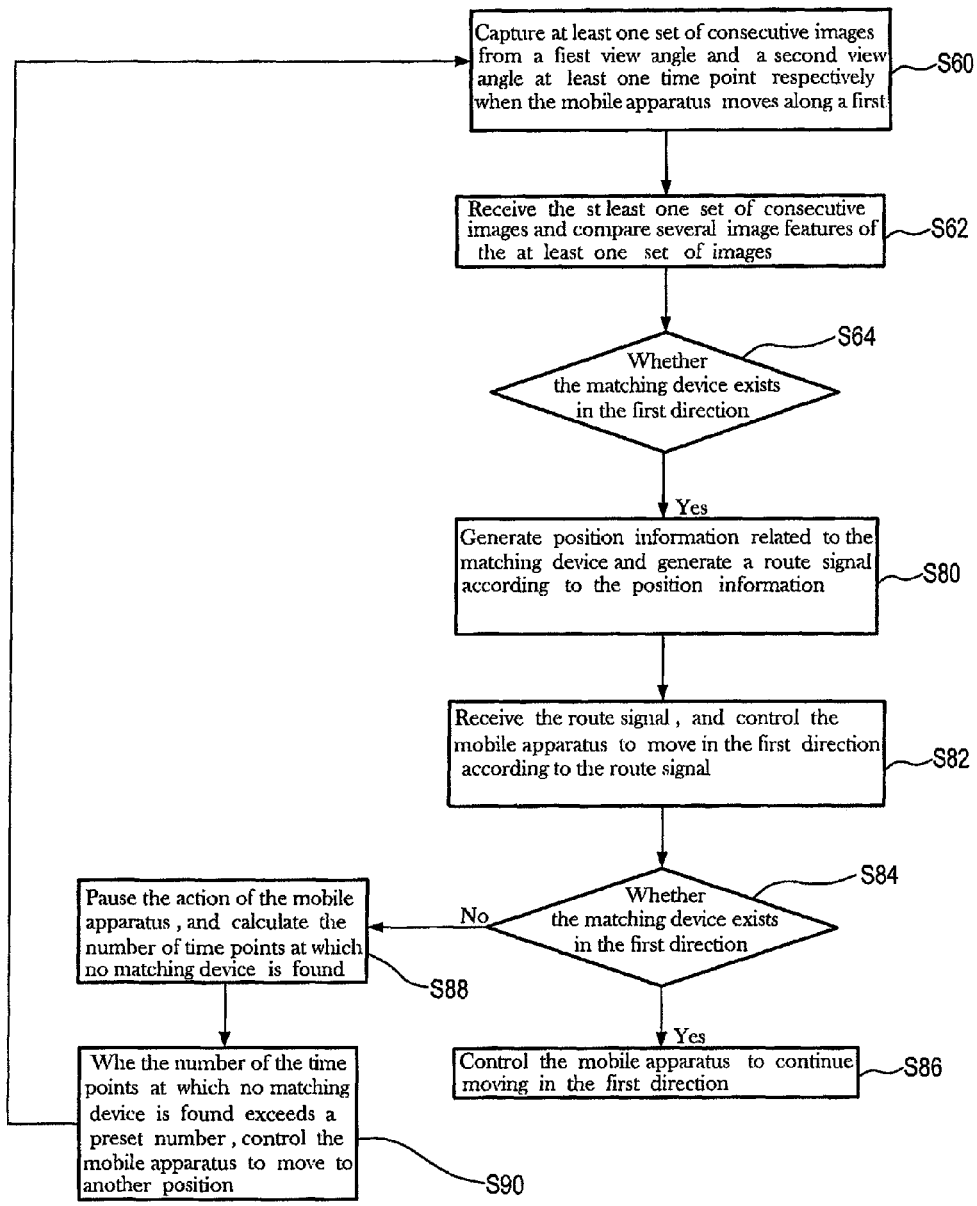
FIG. 3 is a flow chart of an automatic search method according to an embodiment of the invention.

Referring to FIG. 3, FIG. 3 is flow chart of an automatic search method according to another embodiment of the invention. As shown in FIG. 3, in this embodiment, the automatic search method includes Steps S60 to S64, and further comprises the following steps.

In Step S80, position information related to the matching device is generated and a route signal is generated according to the position information.

In Step S82, the route signal is received, and the mobile apparatus is controlled to move in the first direction according to the route signal.

In Step S84, it is determined again whether the matching device exists in the first direction. If it is determined that the matching device exists, in Step S86, the mobile apparatus is controlled to continue moving in the first direction.

On the contrary, if it is determined that no matching device exists in Step S84, in Step S88, the action of the mobile apparatus is paused, and the number of time points at which no matching device is found is calculated. Next, in Step S90, when the number of the time points at which no matching device is found exceeds a preset number, the mobile apparatus is controlled to move to another position, and Step S60 is performed again.

In other words, when it is determined that the matching device exists in the first direction at a $1^{st}$ time point in the time points and it is determined that no matching device exists in the first direction at a $n^{th}$ time point in the process that the mobile apparatus moves towards the matching device, it is determined that a moving obstacle might exist between the mobile apparatus and the matching device. At this time, in the automatic search method of the invention, the action of the mobile apparatus can be paused, the number of the time points at which the no matching device is found is calculated, and when the number exceeds a preset number (for example, but not limited to, 10), the mobile apparatus is controlled to move to another position and Step S60 is performed again.

Additionally, in practice, when a plurality of matching devices exists in the first direction, the automatic search method of the invention can further include the following steps. A distance between a user and each of the matching devices is determined according to the captured images, and the route signal and the adjustment signal are generated according to the obtained distance.

In practical applications, when the mobile apparatus enters a certain area (for example, but not limited to, space such as a living room, a ward, and an office) for the first time, the automatic search system of the invention can first control the mobile apparatus to scan a complete boundary of the area and positions of the matching devices in the area, and store the information in a memory. When entering the area again, the mobile apparatus can move to an adjacent position of the matching device through the stored information and perform more precise positioning, so as to save time for positioning and matching.

In conclusion, in the automatic search system and method according to the invention, a route signal and an adjustment signal are generated in a mode of image capturing and analysis, and a mobile apparatus is controlled to move to an adjacent position of a matching device automatically and to be combined with the matching device, so that cost of installing sensors is saved and time for matching is also reduced, thus enabling higher matching efficiency.

The detailed illustration of the preferred embodiments above is intended to describe the features and spirits of the invention more clearly, rather than to limit the scope of the invention with the preferred embodiments. On the contrary, the objective is to cover various changes and equivalent arrangements in the scope of the claims of the invention. Therefore, the scope of the claims of the invention should be construed in the widest scope according to the illustration above, so that all possible changes and equivalent arrangements can be covered.

What is claimed is:

1. An automatic search system, for assisting a mobile apparatus to search for a matching device, wherein said matching device is a pre-defined device, said search system comprising:
   an image capture module, used for capturing N sets of consecutive images at N time points respectively when the mobile apparatus moves along a first direction, wherein the N is a positive integer greater than 1;
   a processing module, connected to the image capture module, and used for receiving the N sets of consecutive images, comparing M image features of the N sets of consecutive images, determining whether the matching device exists in the first direction accordingly, and if positive, generating a route signal and an adjustment signal, wherein the M is a positive integer;
   a movement module, connected to the processing module, and used for receiving the route signal, and moving according to the route signal so that the mobile apparatus moves to an adjacent position of the matching device; and a matching module, connected to the processing module, and used for receiving the adjustment signal and being combined with the matching device according to the adjustment signal.

2. The automatic search system according to claim 1, wherein the image capture device comprises two cameras for capturing the N sets of consecutive images from a first view angle and a second view angle respectively.

3. The automatic search system according to claim 1, wherein the processing module further comprises:

an analysis unit, connected to the image capture module, and used for comparing the M image features of the N sets of consecutive images, determining whether the matching device exists in the first direction accordingly, and if positive, generating position information of the matching device; and a positioning unit, connected to the analysis unit, and used for receiving the position information, and generating the route signal and the adjustment signal according to the position information.

4. The automatic search system according to claim 3, wherein the M image features comprise at least one selected from a group consisting of a boundary of the matching device, a specific color tone area of the matching device, a specific material of the matching device, and a specific mark of the matching device.

5. The automatic search system according to claim 3, wherein the position information comprises a depth, a horizontal distance, and a vertical distance of the matching device relative to the mobile apparatus.

6. The automatic search system according to claim 1, wherein when a plurality of the matching devices exists in the first direction, the processing module further determines a distance between a user and each of the matching devices according to the N sets of consecutive images, and generates the route signal and the adjustment signal according to the distance.

7. The automatic search system according to claim 1, wherein when determining that no matching device exists in the first direction, the processing module generates a rotation signal to control the image capture module to rotate a preset angle to a second direction, and captures N sets of consecutive images of the mobile apparatus in the second direction.

8. The automatic search system according to claim 7, wherein the processing module calculates an accumulated value of the preset angle, and when the accumulated value exceeds 360°, the processing module controls the mobile, apparatus to move to another position.

9. The automatic search system according to claim 1, wherein when the processing module determines that the matching device exists in the first direction at a kth time point in the N time points, and determines that no matching device exists in the first direction in a (k+1)th time point, the processing module calculates a number of the time points when no matching device is found, and when the number exceeds a preset number, the processing module controls the mobile apparatus to move to another position.

10. The automatic search system according to claim 1, wherein the matching device is a socket.

11. An automatic search method, for assisting a mobile apparatus to search for a matching device, wherein said matching device is a pre-defined device, said search method comprising:

(a) capturing N sets of consecutive images at N time points respectively when the mobile apparatus moves along a first direction, wherein the N is a positive integer greater than 1;

(b) receiving the N sets of consecutive images, comparing M image features of the N sets of consecutive images, and determining whether the matching device exists in the first direction accordingly, wherein the M is a positive integer;

(c) generating a route signal and an adjustment signal if it is determined that the matching device exists in Step (b);

(d) receiving the route signal, and controlling the mobile apparatus to move to an adjacent position of the matching device according to the route signal; and (e) receiving the adjustment signal, and controlling the mobile apparatus to be combined with the matching device according to the adjustment signal.

12. The automatic search method according to claim 11, wherein the Step (a) further comprises:

(a1) capturing the N sets of consecutive images from a first view angle and a second view angle respectively.

13. The automatic search method according to claim 11, wherein the Step (c) further comprises:

(c1) generating position information related to the matching device if it is determined in Step (b) that the matching device exists; and (c2) generating the route signal and the adjustment signal according to the position information.

14. The automatic search method according to claim 13, wherein the M image features comprise at least one selected from a group consisting of a boundary of the matching device, a specific color tone area of the matching device, a specific material of the matching device, and a specific mark of the matching device.

15. The automatic search method according to claim 13, wherein the position information comprises a depth, a horizontal distance, and a vertical distance of the matching device relative to the mobile apparatus.

16. The automatic search method according to claim 11, further comprising:

(c3) when a plurality of the matching devices exists in the first direction, determining a distance between a user and each of the matching devices according to the N sets of consecutive images, and generating the route signal and the adjustment signal according to the distance.

17. The automatic search method according to claim 11, further comprising:

(c4) if it is determined in Step (b) that no matching device exists, generating a rotation signal to control the image capture module to rotate a preset angle to a second direction, and capturing N sets of consecutive images of the mobile apparatus in the second direction.

18. The automatic search method according to claim 17, further comprising:

(c5) calculating an accumulated value of the preset angle, and when the accumulated value exceeds 360°, controlling the mobile apparatus to move to another position, and performing Step (a) again.

19. The automatic search method according to claim 11, further comprising:

(c6) when it is determined that the matching device exists in the first direction at a kth time point of the N time points, and it is determined that no matching device exists in the first direction at a (k+1)th time point, calculating a number of the time points when no matching device is found, and when the number exceeds a preset number, controlling the mobile apparatus to move to another position.

20. The automatic search method according to claim 11, further comprising:
(f) supplying power to the mobile apparatus through the matching device.

* * * * *